United States Patent
Fenwick et al.

(10) Patent No.: US 6,360,285 B1
(45) Date of Patent: *Mar. 19, 2002

(54) APPARATUS FOR DETERMINING MEMORY BANK AVAILABILITY IN A COMPUTER SYSTEM

(75) Inventors: David M. Fenwick, Nashua, NH (US); Denis Foley, Shrewsbury, MA (US); David Hartwell, Bolton, MA (US); Ricky C. Hetherington, Westboro, MA (US); Dale R. Keck, Shrewsbury, MA (US); Elbert Bloom, Marlboro, MA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/269,234

(22) Filed: Jun. 30, 1994

(51) Int. Cl.⁷ ............................................. G06F 12/02
(52) U.S. Cl. ........................................... 710/17; 711/5
(58) Field of Search ................................. 395/800, 842, 395/725, 225; 710/17, 113–125, 4; 711/5

(56) References Cited

U.S. PATENT DOCUMENTS

| | | | |
|---|---|---|---|
| 4,860,252 A | 8/1989 | Sykora | 364/900 |
| 4,903,197 A | 2/1990 | Wallace et al. | 364/200 |
| 4,908,789 A | 3/1990 | Blokkum et al. | 364/900 |
| 4,980,850 A | 12/1990 | Morgan | 364/900 |
| 5,040,153 A | 8/1991 | Fung et la. | 365/230.03 |
| 5,051,889 A | 9/1991 | Fung et al. | 364/200 |
| 5,089,987 A | * 2/1992 | Nakao et | 365/222 |
| 5,155,854 A | * 10/1992 | Flynn et al. | 395/725 |
| 5,239,651 A | * 8/1993 | Sodos | 395/725 |
| 5,241,665 A | 8/1993 | MacDonald | 395/425 |
| 5,253,347 A | * 10/1993 | Bagnoli et al. | 395/325 |
| 5,301,283 A | * 4/1994 | Thacker et al. | 395/325 |
| 5,412,788 A | * 5/1995 | Collins et al. | 395/425 |
| 5,418,914 A | * 5/1995 | Heil et al. | 395/325 |
| 5,438,666 A | * 8/1995 | Craft et al. | 395/842 |
| 5,848,258 A | * 12/1998 | Fenwick et al. | 395/405 |

* cited by examiner

Primary Examiner—John A. Follansbee
(74) Attorney, Agent, or Firm—Cesari & McKenna, LLP

(57) ABSTRACT

In accordance with the present invention, an apparatus includes a system bus having memory bank available signals. Coupled to the system bus are at least two memory modules, each having at least one memory bank. Each memory module includes a mechanism for associating each memory bank with one of the memory bank available signals. Further, each memory module includes logic for determining an availability status of each memory bank and for providing the associated memory bank busy signal with values reflecting the availability status of the memory bank. Additionally, at least two commander modules are coupled to the system bus and include logic, responsive to the memory bank available signals for preventing the commander module from gaining control of the system bus when the commander is attempting to access a memory bank determined to be unavailable. With such an arrangement, only commander modules seeking to access memory banks which are available will be allowed to gain control of the system bus. This avoids stalling the system bus and improves system performance by allowing all initiated transactions to complete as quickly as possible.

38 Claims, 9 Drawing Sheets

APPARATUS FOR DETERMINING MEMORY BANK AVAILABILITY IN A COMPUTER SYSTEM

BACKGROUND OF THE INVENTION

This invention relates generally to computer systems, and more particularly to the access of memory modules directly connected to a system bus of a computer system.

As it is known in the art, computer systems generally include at least one central processing unit (CPU) module, a main memory for storing data, at least one input/output (I/O) module, and a system bus coupling the aforementioned devices to the CPU module. The system bus typically includes data, address, and control lines.

Often, the main memory includes a plurality of memory modules each having an interface connected to the system bus. Each memory module contains semiconductor chips having a predetermined number of memory cells. The chips are often referred to as RAM, Random Access Memory, or DRAM, Dynamic Random Access Memory, in that each storage location is randomly addressable as distinguished from other types of memory devices such as magnetic tape or disk which are sequentially accessible, in that a number of storage locations are scanned before reaching the desired addressed location.

As an example, a 64 K memory chip has $2^{16}$ or 65,536 addressable storage locations. Each storage location contains one memory cell which stores one binary bit of data.

The address range of the computer system is determined primarily by the number of address lines that are provided on the system bus. An address range of 0–64 K requires $2^{16}$ permutations of 16 binary bits. Increasing the address bus by one line effectively doubles the previous address range of the system.

It should be noted that although memory capacity is related to the size of the address range, it is not the same as the address range. Most memory modules store multiple bytes of data at each addressable location. Thus, memory capacity is a function of the number of addressable locations (i.e., address range) and the amount of data stored at each location.

Generally each memory module responds to a different address range within the overall address range of the computer system. The size of each module's address range corresponds to the number of addressable locations on the module. The starting address of a module's address range may be determined by virtue of the position (i.e., backplane slot) in which the module is placed within the computer system, if each module has the same capacity, or the starting address may be assigned through the use of memory configuration software and hardware which determines the number of addressable locations of each memory module in the system prior to assigning address ranges.

CPUs, as well as other commander modules such as the I/O module, are capable of initiating transactions (i.e., read or write) to main memory on the system bus. In order to initiate a transaction on the system bus, a CPU must first gain control of the system bus which is often accomplished by arbitrating for the bus. Once the CPU has gained control of the system bus, the CPU drives an address and a command. If the command is a write to main memory, the CPU will also drive data.

The address driven indicates a location in main memory which the CPU wishes to read data from or write data to. Typically, when an address is driven, each memory module decodes the address to determine if the address being driven is within its address range such that it should respond.

There are often times when a memory module will be inaccessible because it is busy (i.e., unavailable) with another task, such as a memory refresh. Additionally, a memory module may be unavailable for a period of time following a write to main memory. Once the CPU transfers the data to the memory module, the transaction is complete and the system bus can be used by another module to initiate a transaction. However, the memory module generally requires additional time to complete the actual write of the data into the RAMs. Thus, if a subsequent read or write transaction is directed to the same memory module, the memory module may be unavailable and unable to respond.

A memory module may also be busy with another commander module's transaction in a computer system supporting a pipelined system bus. A pipelined system bus allows commander modules to initiate transactions with target modules, for example, memory modules, and then release the system bus such that it may be used by other modules. Subsequently, the target will gain control of the system bus and complete the earlier initiated transaction. In such a system, a first commander may initiate a transaction with a particular memory module and then release the system bus which is immediately controlled by a second commander. Where the second commander initiates a transaction with the same memory module, the memory module will be busy with the first commander's transaction, and thus, unavailable.

Many different techniques have been designed to handle unavailable memory modules, including having the CPU wait on the system bus until the memory module can respond or having the CPU release the system bus and retry the transaction at a later time. However, having the CPU wait on the system bus increases the time it takes to complete a transaction, prevents other commander modules from using the system bus for useful transactions (i.e., transactions which would complete). Furthermore, hardware must be designed to handle such unavailable conditions.

On the other hand, some techniques attempt to avoid a memory unavailable situation. For example, many computer systems partition the memory devices (i.e., RAM) of each memory module into multiple banks. The access circuitry of each bank responds to a different range of addresses allowing each bank to be independently accessed. Further, each bank has its own read and write circuitry such that each bank is entirely independent with the exception that each bank shares the memory module's system bus interface logic. The independent nature of the banks allows a write to a first bank to be followed immediately by a read or write to a second bank without having to wait for the write to the first bank to complete even when both banks are on the same memory module. Partitioning a memory module's addressable locations into independent banks increases the possibility that subsequent transactions will be to different banks, thus, reducing the number of times a CPU may have to wait or retry a memory access. However, an access by a first commander to a memory bank immediately followed by an access of the same memory bank by a second commander in a pipelined computer system will still result in a memory unavailable situation.

Another method which reduces the possibility of sending subsequent transactions to the same memory bank is to interleave memory. Interleaving is the practice of storing data in consecutive memory locations in alternating or successive memory banks. In a conventional 2-way interleaved memory, there is an "even" memory bank and an "odd" memory bank for each range of addresses. Any two sequential memory locations are stored in different memory banks. If two transactions access two sequential memory locations, the operation is as follows: the first location is written, for example, in a first memory bank and the second location is read, for example, from a second memory bank. Thus, since two sequential locations will be in different banks, they can be accessed very quickly without waiting for a write to complete. Other multiple way interleaving (i.e., 4-way, 8-way, etc.) may also be implemented.

The interleaved memory technique is based on the premise that there is a reasonably high probability that sequential accesses to memory will be in successive memory locations. Thus, sequential memory locations are placed in different banks so that they can be accessed quickly. The possibility remains, however, that sequentially issued transactions will be directed at the same memory bank with the result that a subsequent transaction will encounter an unavailable memory bank.

Another technique which avoids sending transactions to a memory bank which is unavailable is to have all commander modules (i.e., all modules capable of issuing transactions directed at main memory) decode addresses sent on the system bus by all other modules to determine and track which memory banks are in use. A CPU trying to access main memory first decodes the address of the bank to be accessed. The CPU then determines whether that memory bank is in use. If the bank is in use, the CPU will not attempt to gain control of the system bus in order to issue the transaction, and if the bank is not in use, then the CPU will attempt to gain control of the system bus and issue the transaction.

There are circumstances, however, which will not always allow a commander module to determine if the memory bank it needs to access is in use (i.e., unavailable). For example, tracking which memory banks are being accessed by other commander modules does not determine whether the memory bank is executing a memory refresh cycle. Further, a previous commander module may have issued a write transaction, and thus, although the previous commander is no longer accessing the memory bank, the memory bank is busy completing the write of the data into the RAMs.

SUMMARY OF THE INVENTION

In accordance with the present invention, an apparatus includes a system bus having memory bank available signals. Coupled to the system bus are memory modules which have at least one memory bank in which data is stored in addressable locations. Each memory module includes a mechanism for associating each memory bank with one of the memory bank available signals. Further, each memory module includes logic for determining an availability status of each memory bank and for providing the associated memory bank available signal with values reflecting the availability status of the memory bank. Additionally, at least two commander modules are coupled to the system bus, where a commander module is a module capable of initiating transactions on the system bus. Each commander module includes logic, responsive to the memory bank available signals, for preventing the commander module from gaining control of the system bus when the commander is attempting to access a memory bank determined to be unavailable. With such an arrangement, only commander modules seeking to access memory banks which are available will be allowed to gain control of the system bus. This avoids stalling the system bus and improves system performance by allowing all initiated transactions to complete as quickly as possible.

In accordance with the invention, a memory bank available signal associated with a memory bank will indicate that the memory bank is unavailable when a commander module accesses the memory bank. Further, where the access is a write of data to the memory bank, the memory bank available signal will reflect an unavailability status until the data is written into the memory bank. In accordance with another aspect of the invention, an unavailability status will be indicated prior to and during the execution of a memory refresh cycle on the memory bank.

In accordance with another further aspect of the invention, the control signals further include memory bank identification signals. Each of the memory banks are responsive to a predetermined value driven on the memory bank identification signals and respond to transactions initiated by commander modules on the system bus, when the predetermined value is driven on the memory bank identification signals. Further, the commander modules include logic for providing the memory bank identification signals with values which correspond to the memory bank they seek to access and logic for using the memory bank identification signals and the memory bank available signals to determine if the memory bank they seek to access is available. With such an arrangement, the memory bank access time is reduced when the memory bank uses the memory bank identification bits as opposed to the full address bus to determine if it is the target. Further, flexible memory addressing and interleaving are permitted through the commander module logic used to provide values on the memory bank identification signals.

DETAILED DESCRIPTION OF A PREFERRED EMBODIMENT

As noted above, this invention involves an apparatus for accessing memory modules.

Figure 1:
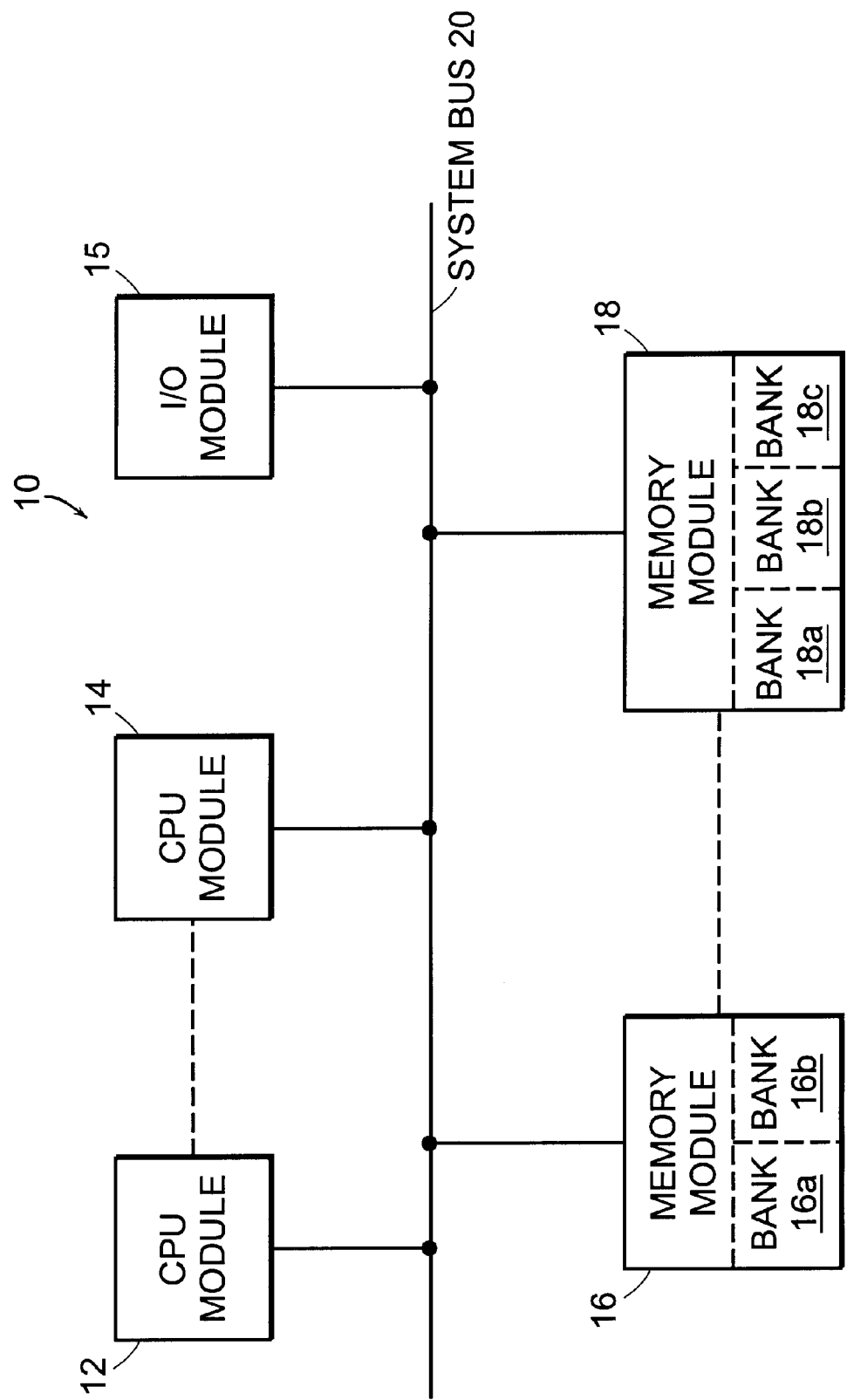
FIG. 1 is a block diagram of a computer system having a plurality of Central Processing Unit (i.e., CPU) modules, an Input/Output (i.e., I/O) module, and a plurality of memory modules connected together by a system bus.

Referring now to FIG. 1, a computer system 10 is shown to include a plurality of central processing unit (CPU) modules 12, 14, an input output (I/O) module 15, and a plurality of memory modules 16, 18 coupled together by a system bus 20. For simplicity, only two CPUs, one I/O, and two memory modules are shown, however, it should be understood that computer system 10 could have more of each module. There may also be other modules (not shown) connected to the system bus.

As also shown in FIG. 1, each memory module 16, 18 has multiple, independent memory banks, 16a and 16b for module 16 and 18a, 18b, and 18c for module 18. The number of memory banks per module is by way of example and it should be understood that in a preferred embodiment each memory module could have more or less memory banks or each memory module could have an equal number of memory banks. The addressing of main memory in a preferred embodiment allows for a flexible number of banks per memory module which will be explained in more detail below.

Figure 2:
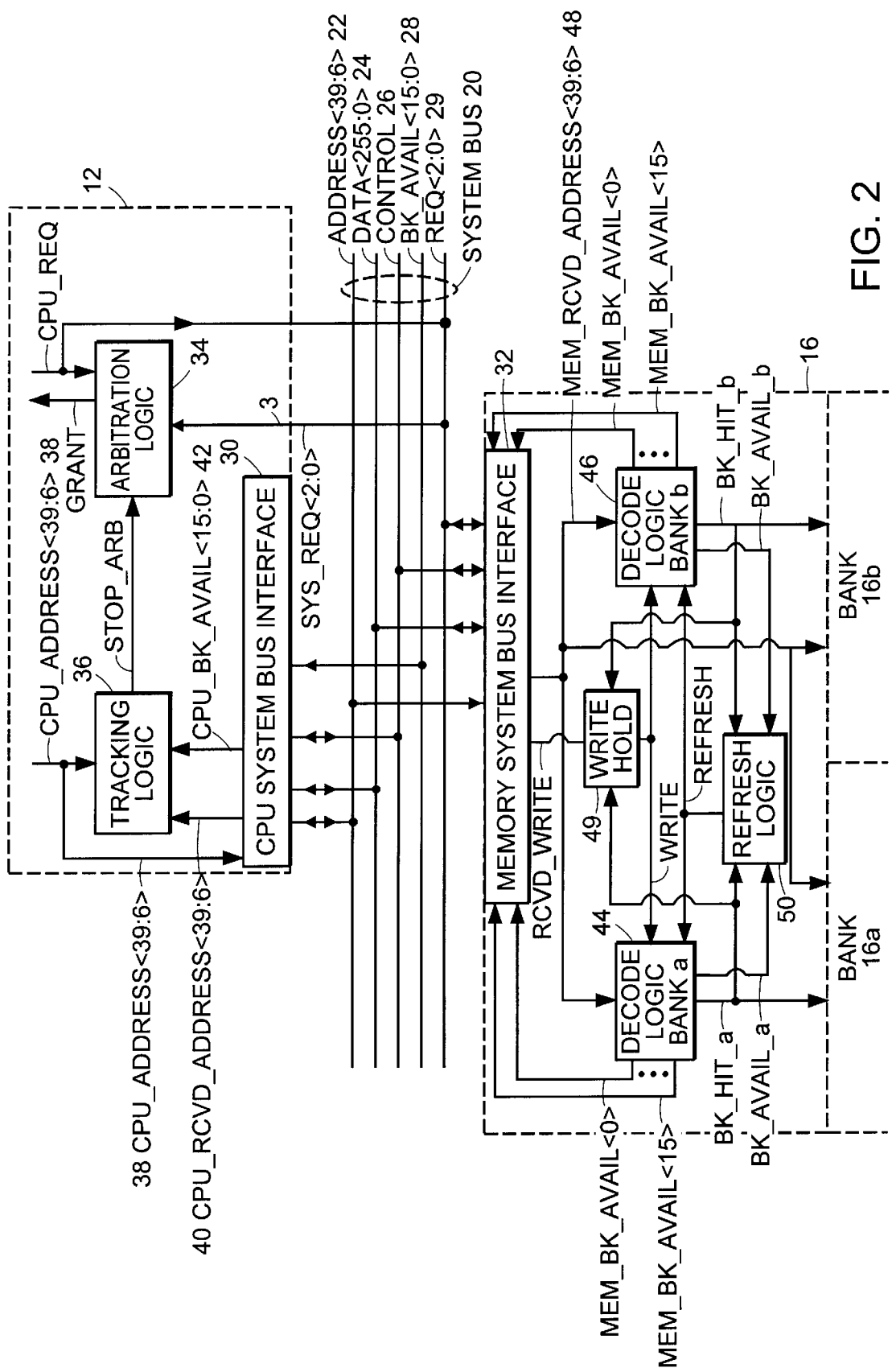
FIG. 2 is a more detailed block diagram of one of the plurality of CPU modules and one of the plurality of memory modules of FIG. 1.

Referring now to FIG. 2 the system bus 20, including address signals 22, data signals 24, and control signals 26, is shown interconnecting a portion of CPU module 12 and memory module 16. The control signals 26 of system bus 20 further include separate memory bank available signals 28 and system bus control request signals 29. One of skill in the art will understand that the system bus 20 could include combined address/data signals, however, a preferred embodiment of the system bus includes separate address lines and data lines.

By way of example, the computer system will be described as supporting one Terabyte of main memory and sixty-four byte block data transfers (i.e., sixty-four byte blocks of data are transferred with each system bus transaction directed at main memory where eight bits equals a byte and five hundred and twelve bits equals a sixty-four byte block). Thus, each addressable memory location will store sixty-four bytes of data, and in order to address sixty-four byte blocks of data, the least significant address bit needed is bit six. Therefore, the address signal lines 22 are denoted as ADDRESS <39:6> 22 (FIG. 2). Each transaction will involve two data cycles where each cycle transfers two hundred and fifty-six bits of data. Hence, the data signal lines 24 are denoted as DATA <255:0> 24 (FIG. 2).

Also by way of example, the present system will be limited to a maximum of sixteen memory banks. Thus, sixteen memory bank available signals 28 are needed and denoted as BK_AVAIL <15:0> 28 (FIG. 2).

The following description will be with reference to CPU 12 and memory module 16. However, it is to be understood that the description of CPU 12 applies to CPU 14, as well as other CPU modules (not shown) and other commander modules capable of initiating transactions directly with main memory, including I/O module 15. Similarly, the description of memory module 16 applies to memory module 18, as well as other memory modules (not shown).

CPU 12 and memory module 16 are shown including each module's system bus interface 30, 32, respectively. CPU 12 includes arbitration logic 34 which receives a request for system bus control signal, CPU_REQ, from one or more processors on CPU 12 (not shown) when a processor wants to gain control of the system bus to initiate a transaction. Upon the assertion of CPU_REQ, arbitration logic 34 begins arbitrating for control of the system bus. Arbitration logic 34 provides a grant signal, GRANT, to the processor if the arbitration logic 34 wins the arbitration.

Arbitration logic 34 is also shown to receive each system bus control request signal, REQ<2:0>, from each commander module on the system bus. It will be understood by one of skill in the art that each module capable of controlling the system bus (i.e., commander module) will have a system bus control request signal associated with it. Thus, by way of example, three system bus control request signals are shown, because the computer system 10 of FIG. 1 shows two CPU modules and one I/O module (i.e., 3 commander modules).

The arbitration scheme depicted in FIG. 2 is typical of a distributed arbitration scheme, however, one of skill in the art will realize that a central arbitration scheme could be used with minor modifications to the logic shown.

CPU 12 also includes tracking logic 36 which receives from one or more processors on CPU 12 (not shown) the available address signals 38, CPU_ADDRESS <39:6>, to be driven onto system bus 20. The CPU system bus interface 30 sends tracking logic 36 the received system bus address bits, CPU_RCVD_ADDRESS <39:6> 40 and the received system bus memory bank available signals, CPU_BK_AVAIL <15:0> 42. With these signals, tracking logic 36 determines if the memory bank the processors (not shown) want to access is available (i.e., not busy with another transaction). In the preferred embodiment, if the bank is unavailable, tracking logic 36 causes arbitration logic 34 to withdraw its request for the system bus, prior to gaining control of the system bus, by generating a stop arbitration signal, STOP_ARB. If, however, during the time required to determine the availability of the memory bank, arbitration logic 34 gains control of the system bus, the STOP ARB signal can be used to force the issuance of a null command on the system bus.

The tracking logic 36 may also be used in a computer system which does not begin arbitrating for the system bus until after the tracking logic 36 determines that the memory bank is available. However, a preferred embodiment reduces the amount of time required to complete a transaction by determining whether a memory bank is available and by beginning arbitration simultaneously.

In determining whether the desired memory bank is available, tracking logic 36 decodes CPU_ADDRESS <39:26> to determine which memory bank 16a or 16b of module 16 or 18a, 18b, or 18c of module 18 (FIG. 1) is the target of the intended transaction. It then compares the target bank to the received memory bank available signals, CPU_BK_AVAIL <15:0> 42. If the target bank's corresponding bank available signal is deasserted (i.e., the memory bank is unavailable), then tracking logic 36 asserts STOP_ARB to cause arbitration logic 34 to withdraw its request for system bus control or to force a null command on the system bus.

Tracking logic 36 also compares CPU_ADDRESS <39:26> 38 to CPU_RCVD_ADDRESS <39:6> 40, where CPU_RCVD_ADDRESS <39:6> 40 reflects the value driven on the system bus ADDRESS <39:6> 22 signals in the current transaction. If the address bits match, then the processor on CPU 12 is attempting to access an unavailable memory bank and tracking logic 34 asserts STOP_ARB to arbitration logic 40.

If the memory banks are able to deassert their corresponding memory bank available signals, BK_AVAIL <15:0> 28, within sufficient time such that CPU_BK_AVAIL <15:0> 42 reflects the most recent memory bank access when tracking logic 36 compares the target bank to CPU_BK_AVAIL <15:0>, then the compare of CPU_ADDRESS <39:6> 38 to CPU_RCVD_ADDRESS <39:6> 40 may be unnecessary.

Conversely, the memory banks may only be able to deassert their corresponding memory bank available signals, BK_AVAIL <15:0> 28, two or more address cycles following the cycle in which they are addressed. In such a computer system, comparing CPU_ADDRESS <39:26> 38 to CPU_RCVD_ADDRESS <39:6> 40 will only determine the current memory bank which is being accessed, it will not determine which memory bank was addressed in the previous cycle or cycles. Therefore, in such a computer system, during the address cycle or cycles following the addressing of a memory bank and until the corresponding memory bank available signal is deasserted, tracking logic 36 must include logic to track memory banks which have been accessed but which do not yet have their memory bank available signals deasserted. One example of this will be more fully discussed below.

FIG. 2 also shows a more detailed diagram of memory module 16. As described with reference to FIG. 1, memory module 16 includes a memory system bus interface 32 and memory banks 16a and 16b. As shown in FIG. 2, memory module 16 further includes decode logic for bank a and bank b, 44, 46 respectively, which are both connected to memory system bus interface logic 32. Memory system bus interface logic 32 receives the system bus ADDRESS <39:6> 22 signals and sends MEM_RCVD_ADDRESS <39:6> 48 to the decode logic for both bank a 44 and bank b 46.

Each of the memory banks on the system bus must correspond to one of the system bus bank available signals, BK_AVAIL <15:0>. Where each memory module in a computer system is required to contain the same number of memory banks, the bank available signals may be assigned by virtue of the memory module's position (i.e., backplane slot) on the system bus 20. In a preferred embodiment, where each of the memory modules may contain a variable number of memory banks, each memory module is connected to all sixteen system bus bank available signals, BK_AVAIL <15:0> and within decode logic 44 and 46 is logic, to be described in more detail below, for determining which bank available signal is associated with the corresponding memory bank.

Decode logic 44 and 46 use MEM_RCVD_ADDRESS <39:6> 48 to determine if their associated memory bank 16a, 16b is the target of the current system bus transaction. If one of the memory banks 16a or 16b is the target of the current transaction, the associated decode logic 44 or 46 asserts a bank hit signal, BK_HIT_a or BK_HIT_b, respectively, to memory bank control logic (not shown) and deasserts a corresponding memory bank available signal, MEM_BK_AVAIL <N>, to memory system bus interface logic 32. The control logic (not shown) will then cause the memory bank to respond to the current system bus transaction. The deasserted memory bank available signal notifies all commander modules on the system bus that the corresponding memory bank is unavailable.

As also shown in FIG. 2, memory module 16 includes write hold logic 49. Decode logic 44, 46 sends the bank hit signal, BK_HIT_a or BK_HIT_b, respectively, to write hold logic 49, and the memory system bus interface 32 sends write hold logic 49 received system bus write signal, RCVD_WRITE, which indicates whether the current bus transaction is a write or a read. Where the current transaction is a write and memory bank 16a or 16b is the target (i.e., BK_HIT_a or BK_HIT_b is asserted), write hold logic 49 will assert a WRITE signal to decode logic 44 and 46. The assertion of WRITE causes decode logic 44 or 46 to continue to deassert its corresponding memory bank available signal for a predetermined amount of time equal to the amount of time necessary for the data received by the memory system bus interface 32 on DATA <255:0> 24 to be stored in the RAMs (not shown) of the memory bank. This prevents another CPU or I/O module (i.e., commander module) from attempting to access the memory bank until the write is completed. This will be described in more detail below.

Similarly, in the preferred embodiment, decode logic 44 and 46 deasserts the corresponding memory bank available signal while the memory bank is undergoing a memory refresh cycle. As shown in FIG. 2, memory module 16 includes refresh logic 50. Decode logic 44, 46 sends BK_HIT_a and BK_HIT_b, respectively, to refresh logic 50, and refresh logic 50 sends a refresh cycle signal, REFRESH, to decode logic 44, 46. If neither BK_HIT_a or BK_HIT_b are asserted (i.e., neither memory bank 16a or 16b are currently involved in a transaction), prior to the execution of a refresh cycle, for example, two system bus cycles, refresh logic 50 asserts REFRESH to decode logic 44 and 46. The assertion of REFRESH causes decode logic 44 and 46 to deassert the corresponding memory bank available signal to prevent a memory bank access during the memory refresh cycle. If within the two system bus cycles prior to the execution of the refresh cycle, the decode logic 44 or 46 asserts BK_HIT_a or BK_HIT_b to indicate an access of the corresponding memory bank, the refresh logic will deassert REFRESH and wait until after the completion of the current transaction to reassert REFRESH and retry the execution of the refresh cycle. This may occur when a commander module begins arbitration and determines that the memory bank is available prior to the deassertion of the bank available signal indicating a refresh cycle. This will be described in more detail below.

Figure 3:
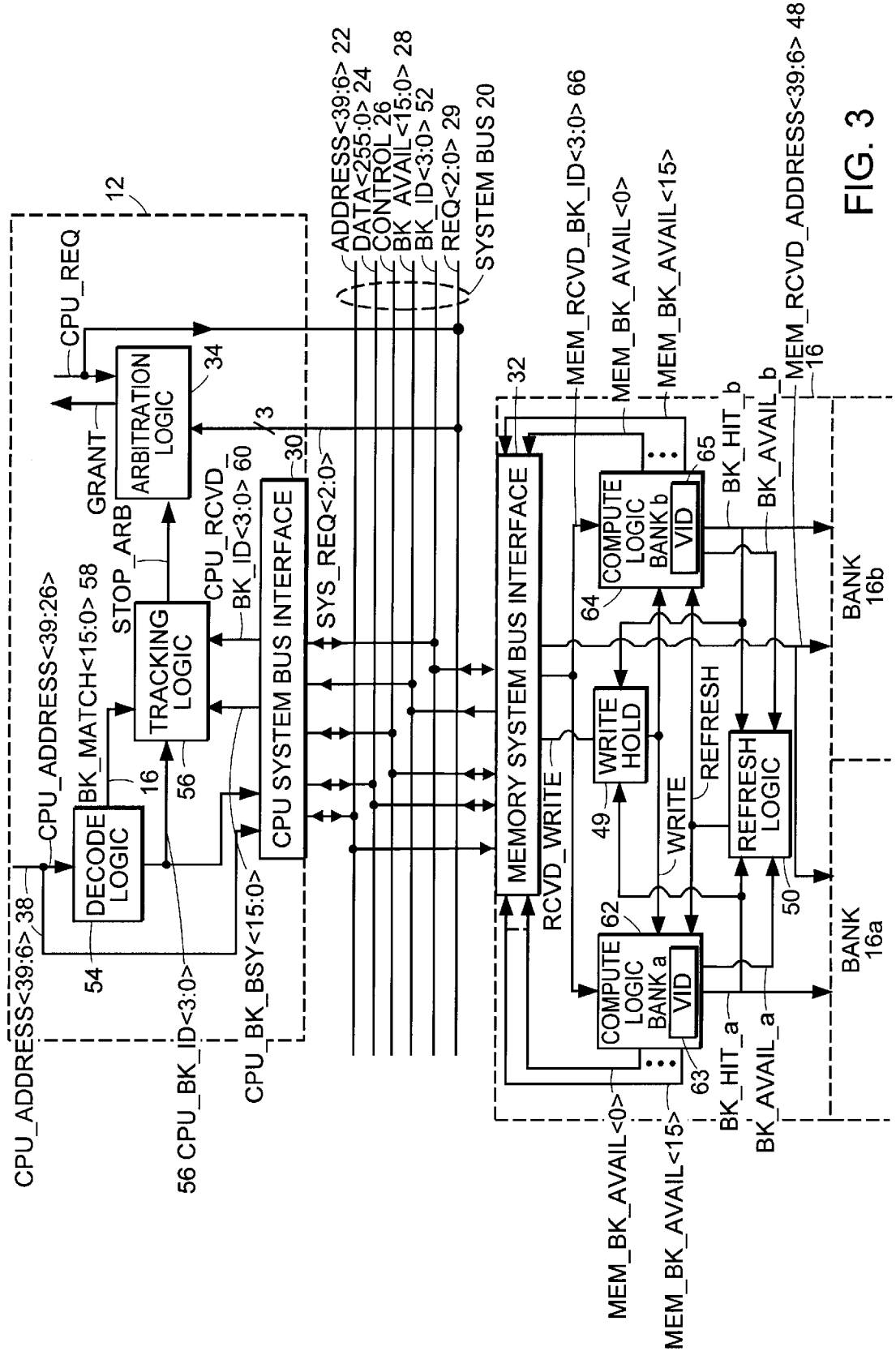
FIG. 3 is a more detailed block diagram of a preferred embodiment of one of the plurality of CPU modules and one of the plurality of memory modules of FIG. 1.

Referring now to FIG. 3, in a preferred embodiment, the system bus is shown to include memory bank identification signals, BK_ID <3:0> 52. Elements having identical numbers in different figures function similarly. CPU 12 is shown to again include arbitration logic 34 which behaves in a similar fashion as the arbitration logic 34 of FIG. 2, however, CPU 12 is also shown to include decode logic 54 and tracking logic 56. Tracking logic 56 behaves in a similar manner to tracking logic 36 of FIG. 2, with the exception that tracking logic 56 does not receive CPU_ADDRESS <39:6> 38. Instead, tracking logic 56 receives bank identification signals, CPU_BK_ID <3:0> 56, and bank match signals, BK_MATCH <15:0> 58, from decode logic 54 which generates these signals from a portion, of the available address signals CPU_ADDRESS <39:26>. Additionally, tracking logic 56 does not receive the system bus address signals, but rather, the CPU system bus interface 30 sends tracking logic 56 received bank identification signals, CPU_BK_ID <3:0> 60. Again the CPU system bus interface sends tracking logic 56 the received bank available signals, CPU_BK_AVAIL <15:0>, as describe in reference to FIG. 2, and tracking logic 56 generates a stop arbitration signal, STOP_ARB, when a processor (not shown) attempts to access an unavailable memory bank.

The portion of the address signals 38 which the decode logic 54 receives indicates which memory bank the processor or other logic is attempting to access (i.e., target of the transaction). By way of example, decode logic 54 receives fourteen (i.e., CPU_ADDRESS <39:26>) of the available thirty-four address signals (i.e., CPU_ADDRESS <39:6> 38). The least significant address bit <26> indicates the smallest allowable single bank capacity (i.e., each memory bank must be able to store at least $2^{26}$ bytes, sixty-four mega-bytes, of data).

Decode logic 54 then drives memory bank identification signals, CPU_BK_ID <3:0> 56, with logic levels corresponding to the memory bank to be accessed. The CPU system bus interface logic 30 receives CPU_BK_ID <3:0> 56, and if CPU 12 gains control of system bus 20 through arbitration logic 34, CPU bus interface logic 30 will drive BK_ID <3:0> 52 with logic levels which correspond to the logic levels on CPU_BK_ID <3:0> 56. The CPU bus interface logic 30 will also drive ADDRESS <39:6> 22 of system bus 20 with logic levels which correspond to the logic levels on CPU_ADDRESS <39:6> 38, CONTROL 26 with logic levels corresponding to an appropriate command, and DATA <255:0> 24 with logic levels corresponding to data to be transferred, in the case of a write.

As also shown in FIG. 3, memory module 16 includes compare logic 62, 64 for memory banks 16a and 16b, respectively. Compare logic 62, 64 is similar to decode logic 44, 46 of FIG. 2 with the exception that memory system bus interface 32 sends compare logic 62, 64 the received memory bank identification signals, MEM_RCVD_BK_ID <3:0> 66 as opposed to the received system bus address, MEM_RCVD_ADDRESS <39:6> 48. The compare logic 62, 64 uses MEM_RCVD_BK_ID <3:0> 66, to determine whether its associated memory bank 16a or 16b, respectively, is the target of the current transaction. This determination will be described in more detail below.

In a preferred embodiment, at power-up the computer system's configuration software determines what memory modules are on the system bus, how many banks each memory module has and each memory bank's capacity. With this information, the configuration software decides which memory bank will respond to which range of system bus addresses.

There may also be times when the configuration software is called upon to reconfigure memory. For example, where a memory module or bank experiences errors, the configuration software may reconfigure memory such that the failing memory bank or the failing portion of the memory bank is not within the total address range of main memory.

In a preferred embodiment, each module, including I/O module 15 (FIG. 1), capable of initiating transactions directly with main memory (i.e., commander modules) contains decode logic similar to decode logic 54 of CPU 12 (FIG. 3). Within decode logic 54, there are several memory bank mapping registers. The configuration software of the present computer system loads the memory bank mapping registers with information as to which memory bank will respond to which addresses. Further, each memory bank includes compare logic similar to compare logic 62, 64 of memory module 16 (FIG. 3). Within compare logic 62, 64 is a virtual identification register 63, 65, respectively, (i.e., VID register) holding a value indicating to which memory bank identification signals the corresponding memory bank will respond. The configuration software loads the VID registers 63, 65 associated with each memory bank such that each memory bank will respond to a unique value on the memory bank identification signals.

Figure 4:
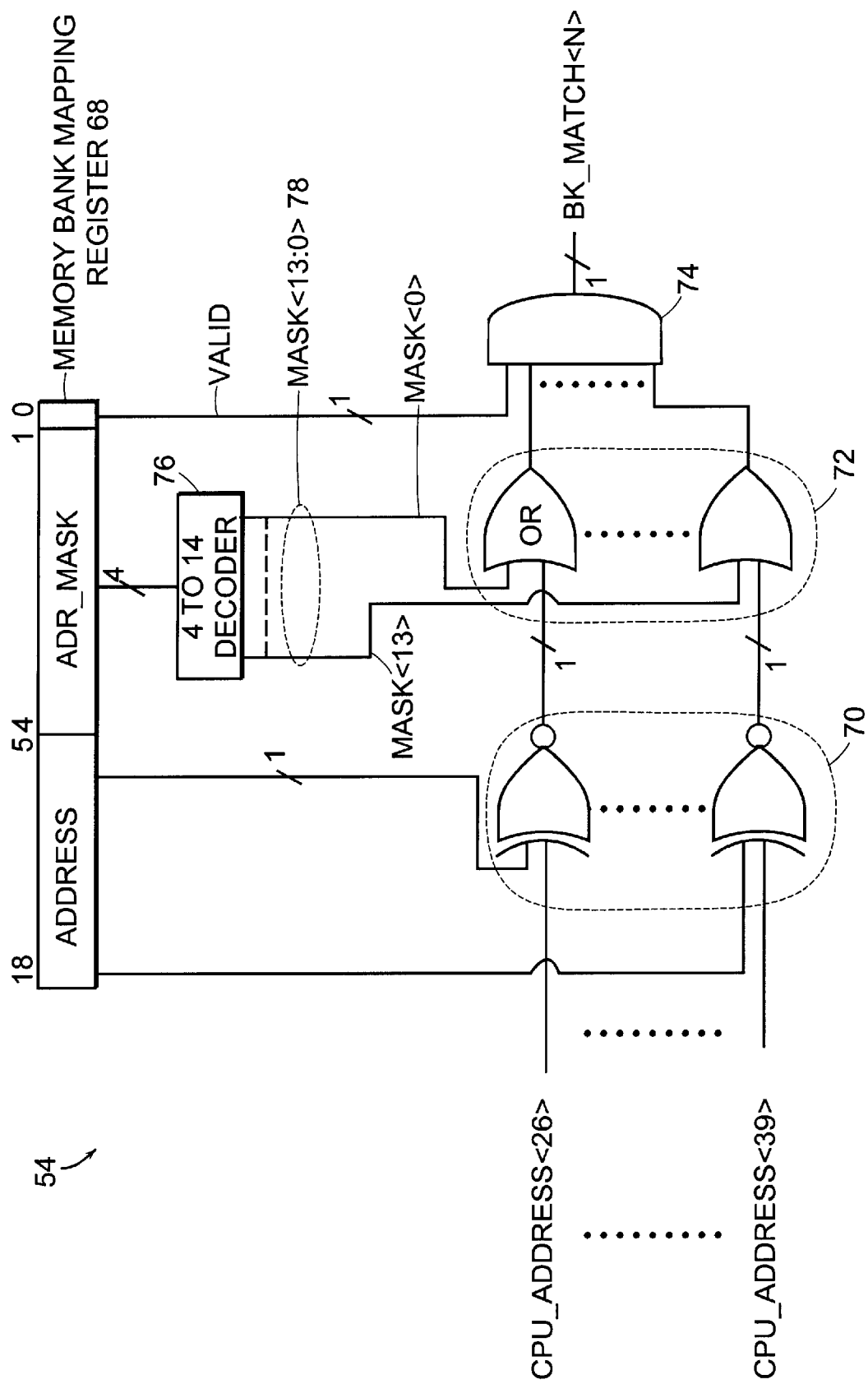
FIG. 4 is a more detailed block diagram of the decode logic of FIG. 3 in accordance with the invention.

Referring now to FIG. 4, a more detailed diagram of decode logic 54 of CPU 12 (FIG. 3) is shown including a memory bank mapping register 68. One of skill in the art will understand that the following implementation of decode logic 54 is by way of example and identical functionality can be achieved through a variety of logic designs. As shown, memory bank mapping register 68 includes an address field, Address <18:5>, an address mask field, Adr_mask <4:1>, and a valid bit, VALID. As previously mentioned, decode logic 54 will include a plurality of memory bank mapping registers (not shown) equal to the maximum number of memory banks available on the system bus. Memory bank mapping register 68 will be described as an example of one of the plurality of memory bank mapping registers.

A computer system may not necessarily have the maximum allowable number of memory banks, and thus, the configuration software sets (i.e., asserts, logic level high or one) the VALID bit in each memory bank mapping register that corresponds to a useable memory bank. Further, if a memory bank experiences errors or faults, the configuration software can reconfigure memory such that the faulty memory bank is not included in main memory by reassigning address ranges and deasserting the VALID bit in the memory bank mapping register corresponding to the failing memory bank.

Address <18:5> is loaded by the configuration software with the address range to which memory bank mapping register 68 will respond. For each address driven by a processor on CPU 12, each bit of Address <18:5> is compared with each bit of CPU_ADDRESS <39:26> 38 through a series of fourteen, two-input exclusive NOR (i.e., XNOR) gates 70. Each XNOR gate will provide a logic high at its output if the two inputs are the same logic level (i.e., both logic high or both logic low).

The outputs of each of XNOR gates 70 are sent to an input of a series of fourteen, two-input OR gates 72. If each bit of Address <18:5> and CPU_ADDRESS <39:26> match, then each of XNOR gates 70 will output a logic high which will cause each of OR gates 72 to output a logic high. If the VALID bit is a logic high, then all the inputs to AND gate 74 will be a logic high which will cause the output of AND gate 74, BK_MATCH <N>, to be a logic high indicating that the memory bank associated with memory bank mapping register 68 is the memory bank the processor driving CPU_ADDRESS <39:6> is trying to access.

Depending upon the capacity of the corresponding memory bank, some of the bits of Address <18:5> and CPU_ADDRESS <39:26> 38 should not be compared. For example, where a memory bank is capable of storing more than the minimum amount of data (i.e., sixty-four megabytes), the least significant address bit necessary to determine the memory bank's address range will be higher than CPU_ADDRESS <26>. In this case, one or more of the lower order address bits of CPU_ADDRESS <39:26> will change for accesses to different addressable locations within the same memory bank. Because the bits of Address <18:5> are fixed by the configuration software when memory is configured or reconfigured, a compare of a portion of lower order bits of Address <18:5> to the changing lower order bits of CPU_ADDRESS <39:26> would produce a logic low or a miscompare. Thus, where a memory bank has a storage capacity larger than the minimum allowable storage capacity, a portion of the lower order bits of Address <18:5> and CPU_ADDRESS <39:26> should not be compared.

In order to provide for this flexibility, the Adr_mask <4:1> field is provided. These four bits are passed through decoder 76 which provides fourteen mask bits, MASK <13:0> 78, according to the following table, where the first column, IN, represents the hexadecimal value of Adr_mask <4:1> and the following fourteen columns, OUT, represent the binary value of MASK <13:0> 78:

| IN | OUT |
|---|---|
| 0 0 0 0 0 0 0 0 0 0 0 0 0 0 0 0 0 0 |
| 0 0 0 1 0 0 0 0 0 0 0 0 0 0 0 0 0 1 |
| 0 0 1 0 0 0 0 0 0 0 0 0 0 0 0 0 1 1 |
| 0 0 1 1 0 0 0 0 0 0 0 0 0 0 0 1 1 1 |
| 0 1 0 0 0 0 0 0 0 0 0 0 0 0 1 1 1 1 |
| 0 1 0 1 0 0 0 0 0 0 0 0 0 1 1 1 1 1 |
| 0 1 1 0 0 0 0 0 0 0 0 0 1 1 1 1 1 1 |
| 0 1 1 1 0 0 0 0 0 0 0 1 1 1 1 1 1 1 |
| 1 0 0 0 0 0 0 0 0 0 1 1 1 1 1 1 1 1 |
| 1 0 0 1 0 0 0 0 0 1 1 1 1 1 1 1 1 1 |
| 1 0 1 0 0 0 0 0 1 1 1 1 1 1 1 1 1 1 |
| 1 0 1 1 0 0 0 1 1 1 1 1 1 1 1 1 1 1 |
| 1 1 0 0 0 0 1 1 1 1 1 1 1 1 1 1 1 1 |
| 1 1 0 1 0 1 1 1 1 1 1 1 1 1 1 1 1 1 |
| 1 1 1 0 1 1 1 1 1 1 1 1 1 1 1 1 1 1 |

If all of the address bits (i.e., Address <18:5> and CPU_ADDRESS <39:6>) are to be used, the configuration software loads Adr_mask <4:1> with logic lows, zeros in the table, which are decoded by decoder 76 to provide MASK <13:0> 78 with all logic low values, according to the above table. These logic lows would be passed to OR gates 72. The output of OR gates 72 would then be dependent upon the output of the XNOR gates 70 (i.e., if the XNOR gate outputs a logic high, then the OR gate will output a logic high, and if the XNOR gate outputs a logic low, then the OR gate will output a logic low).

On the other hand, if less than all the available address bits are to be used, the configuration software would load Adr_mask <4:1> with something other than zero, for example, a value of four (i.e., binary 0100). Decoder 76 would then provide MASK <13:4> with logic low and MASK <3:0> with logic high, according to the table. Thus, the outputs of the OR gates of the series of OR gates 72 which receive the outputs of the XNOR gates of the series of XNOR gates 70 which compare Address <13:4> to CPU_ADDRESS <39:30> would depend upon the results of the XNOR gates, as above. However, the outputs of the OR gates which receive the outputs of the XNOR gates which compare Address <3:0> to CPU_ADDRESS <29:26> will always be a one, because MASK <3:0> are logic highs (i.e., ones in the table) which force the OR gates to output logic highs regardless of the output of the XNOR gates. This allows BK_MATCH <N> to be asserted even if the lower order, Address <3:0> and CPU_ADDRESS <29:26>, do not match. Thus, a portion of the lower order address bits of Address <3:0> and CPU_ADDRESS <39:26> can be masked by Adr_mask <3:0> such that memory banks of varying sizes can be used in the same computer system.

As discussed above, each module capable of initiating a transaction directly with main memory has logic similar to decode logic 54 (FIG. 3) which includes a plurality of memory bank mapping registers 68 and associated matching logic (FIG. 4). There will be one BK_MATCH <N> signal for each memory bank mapping register, and the N in BK_MATCH <N> will be a number corresponding to the associated memory bank, for example, BK_MATCH <1>, BK_MATCH <8>, etc. In the present system, there are four memory bank identification signals, BK_ID <3:0> 52 (FIG. 3), indicating that the computer system can support a maximum of sixteen memory banks. If memory is not interleaved, sixteen memory mapping registers are needed to support sixteen memory banks.

Figure 5:
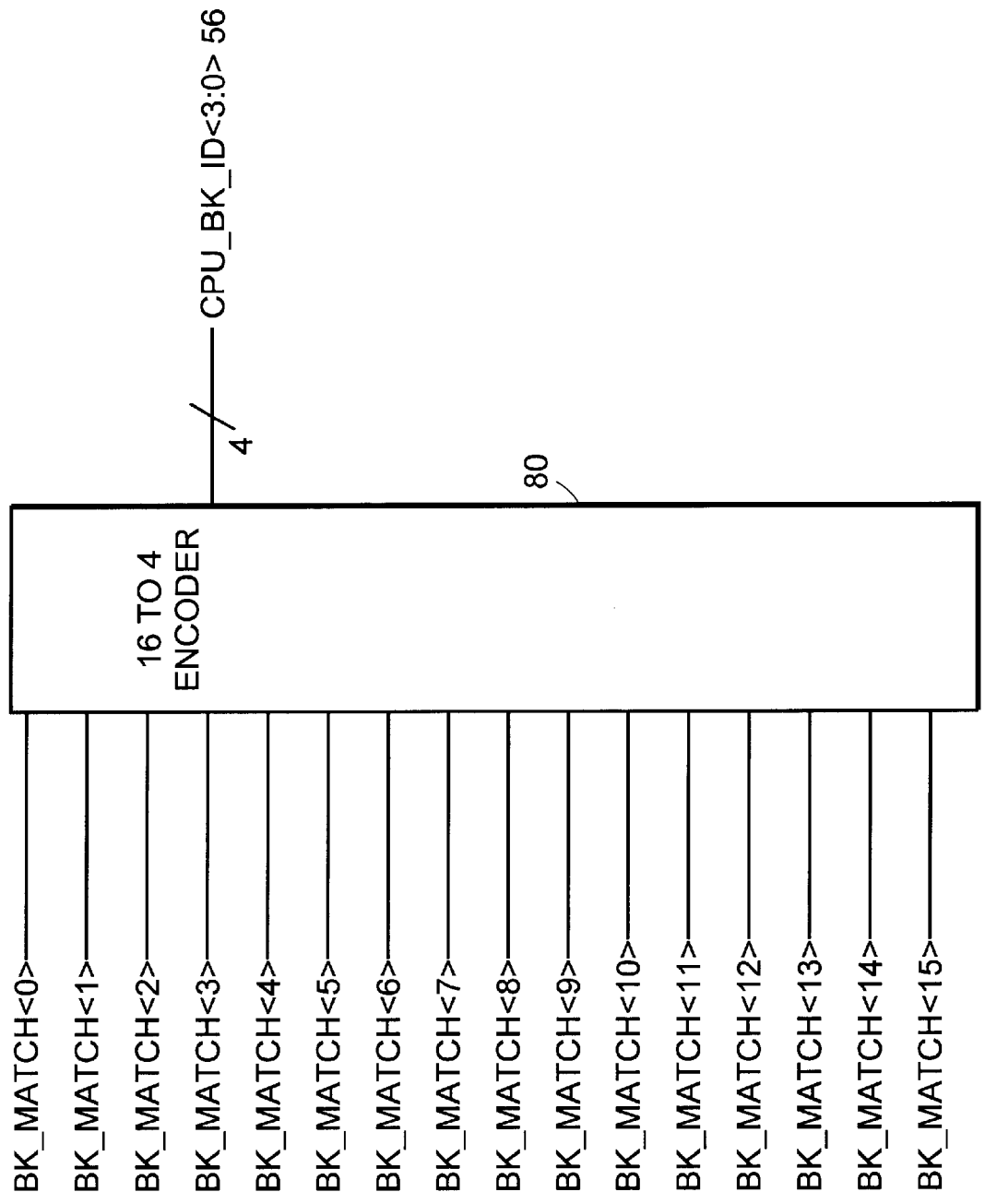
FIG. 5 is a more detailed block diagram of the decode logic of FIG. 3 in accordance with the invention.

Referring now to FIG. 5, a sixteen bit to four bit encoder 80 is shown. Each memory bank mapping register and associated matching logic provides one BK_MATCH <N> signal which is encoded into CPU_BK_ID <3:0> 56 and driven to CPU system bus interface logic 30 (FIG. 3).

As discussed above, interleaving is the practice of storing data in consecutive memory locations in alternating or successive memory banks. In the present computer system, the memory bank mapping registers within decode logic 54 (FIG. 3) can be expanded to include fields which provide for memory interleaving.

Figure 6:
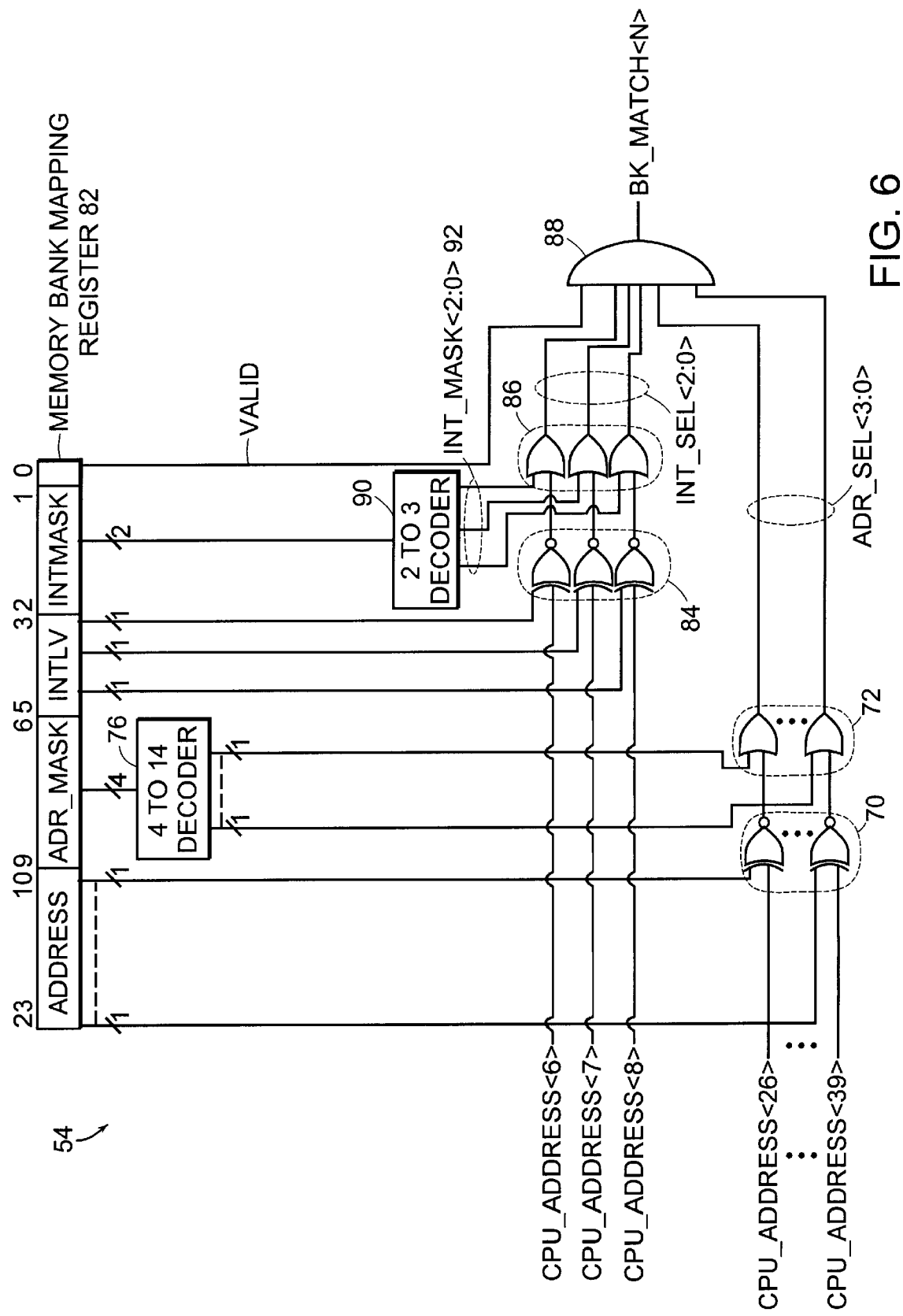
FIG. 6 is a more detailed block diagram of the decode logic of FIG. 3 in accordance with the invention.

Referring now to FIG. 6, an expanded memory bank mapping register 82 is shown to include an address field, Address <23:10>, an address mask field, Adr_mask <9:6>, an interleave field, Intlv <5:3>, an interleave mask field, Intmask <2:1>, and a VALID bit. The address field, address mask field and VALID bit are used in a manner identical to their use with respect to FIG. 4 and similarly numbered figure elements represent identical functions and will not be further described. Again, one of skill in the art will understand that the following implementation of decode logic 54 is by way of example and identical functionality can be achieved through a variety of logic designs.

The configuration software may configure the memory banks such that two or more of the banks are interleaved. By way of example, the interleave field is three bits wide, Intlv <5:3>, which provides for a maximum of eight-way interleaving. A greater number of banks may be interleaved by using each memory bank mapping register to decode more than one memory bank match signal which will be described in more detail below.

As shown in FIG. 6, each of the three interleave bits go to an input of a series of three, two-input XNOR gates 84, while CPU_ADDRESS <8:6> are driven to a second input of the series of XNOR gates 84. If both inputs to the XNOR gates are the same (i.e., both logic high or both logic low), then the XNOR gate will produce a logic level high at its output, otherwise the XNOR gate provides a logic level low at its output. Each of the outputs of the XNOR gates 84 are connected to an input of a series of three, two-input OR gates 86. If the XNOR gate outputs are logic highs, then the OR gate outputs will also be logic highs. The outputs of the OR gates 86, INT_SEL <2:0>, are then provided to AND gate 88 along with the outputs of the OR gates 72, ADR_SEL <13:0>, and the VALID bit. If all inputs to AND gate 88 are a high logic level, then the output of the AND gate 88, BK_MATCH <N>, will also be a logic high.

In order to provide for multiple-way interleaving (i.e., 2-way, 4-way, etc.), the interleave mask field, Intmask <2:1>, is loaded by the configuration software to indicate which interleave bits should be considered and which ignored. The Intmask <2:1> are provided to a two to three decoder 90 which provides INT_MASK <2:0> 92 bits to the second input of OR gates 86 according to the following table, where the first two columns, IN, represents the binary value of Intmask <2:1> and the following three columns, OUT, represent the binary value of INT_MASK <2:0> 92:

| IN | | OUT | | |
|---|---|---|---|---|
| 0 | 0 | 1 | 1 | 1 |
| 0 | 1 | 1 | 1 | 0 |
| 1 | 0 | 1 | 0 | 0 |
| 1 | 1 | 0 | 0 | 0 |

If there is to be no interleaving (i.e., interleaving disabled), the configuration software will set interleave mask bits, Intmask <2:1>, to all logic lows, zeros in the table. This will cause decoder 90 to provide INT_MASK <2:0> with all logic high values which will force the outputs of OR gates 86 high regardless of whether the bits in Intlv <5:3> match CPU_ADDRESS <8:6>.

Conversely, if there is to be interleaving, the configuration software will set Intmask <2:1> to some value other than zero. For example, if Intmask <2:1> are set to a value of two (i.e., binary 10), decoder 90 will provide a value of four (i.e., binary 100), according to the table, on INT_MASK <2:0>. INT_MASK <2:0> being a logic high will force a logic high on the output of the OR gate of the series of OR gates 86 regardless of whether Intlv <5> matches CPU_ADDRESS <8>. However, INT_MASK <1:0> will be logic lows which allows the result of the XNOR gates, of the series of XNOR gates 84, which are comparing Intlv <4:3> to CPU_ADDRESS <7:6> to determine the results of the OR gates of the series of OR gates 86. Through the expanded memory bank mapping register 82, the configuration software can interleave eight of the memory banks, less than eight of the memory banks, or none of the memory banks.

As described above, each of the memory bank mapping registers and associated matching logic provide a BK_MATCH <N> signal. The sixteen to four encoder 80 of FIG. 5 works equally well with the expanded memory bank mapping registers and their associated matching logic to provide CPU_BK_ID <3:0> 56.

In order to reduce the number of memory bank mapping registers needed on each commander module without reducing the number of available memory banks, each memory bank mapping register can be used to match more than one memory bank. In order to do this, there must be some amount of interleaving and the memory bank mapping registers must include a multiple-bank matching field.

Figure 7:
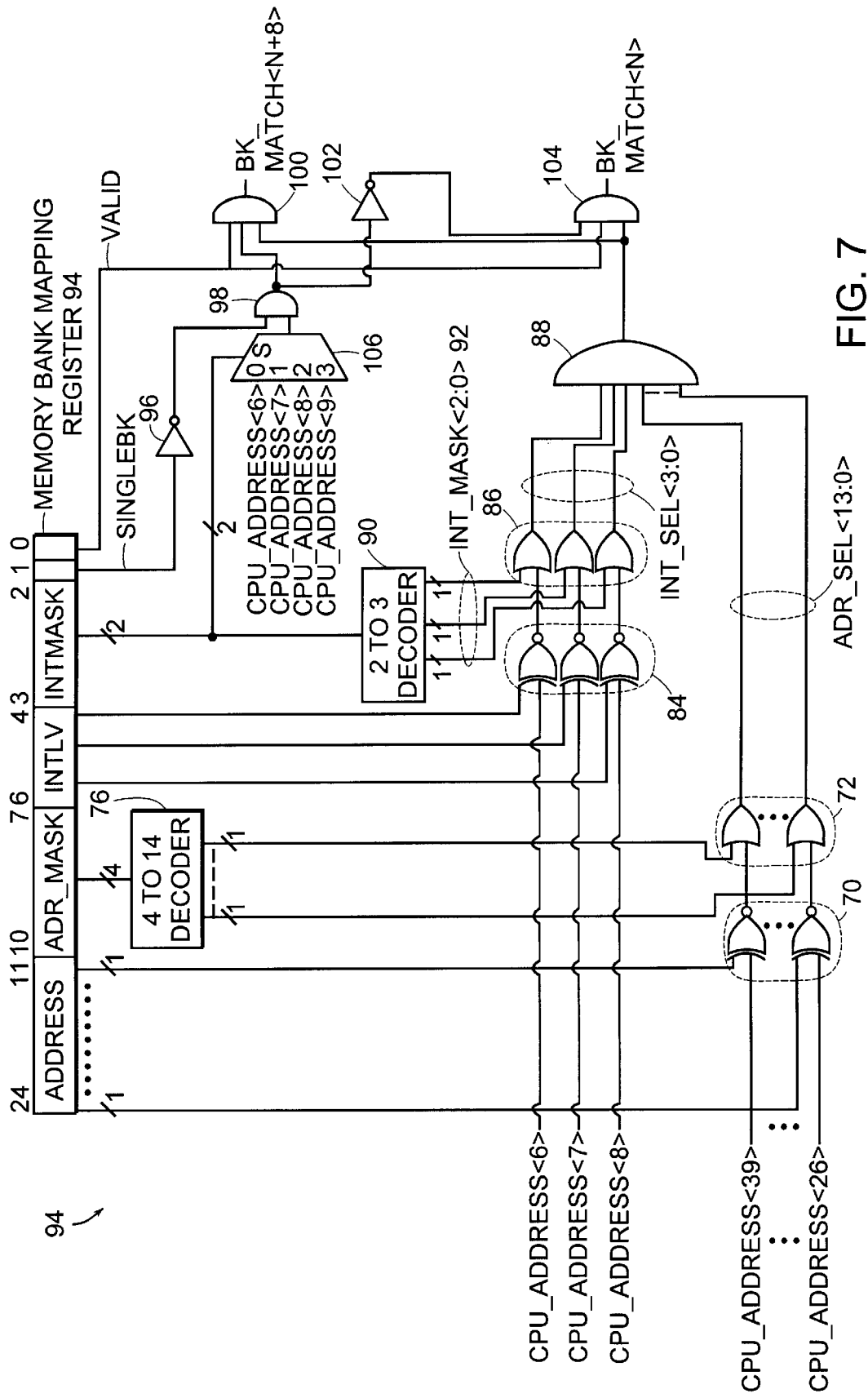
FIG. 7 is a more detailed block diagram of the decode logic of FIG. 3 in accordance with the invention.

Referring now to FIG. 7, an expanded memory bank mapping register 94 is shown to include all the fields of memory bank mapping register 82 (FIG. 6) and additionally, a multiple-bank matching field, SINGLE_BK. By way of example, the multiple bank matching field will be a single bit permitting each memory mapping register to be associated with one or two memory banks. Thus, only eight memory bank mapping registers will be needed for a computer system with sixteen memory banks. As mentioned above, identically numbered drawing elements in different figures function similarly and will not be discussed.

Because the configuration software fixes the value of SINGLE_BK, if SINGLE_BK is asserted (i.e., logic level high), then multiple bank matching is disabled and the memory bank mapping register will only be used to match a single memory bank. Stepping through FIG. 7, a logic high on SINGLE_BK causes NOT gate 96 to provide a logic low to AND gate 98 which provides a logic low to AND gate 100 and NOT gate 102 which provides a logic high to AND gate 104. Thus, AND gates 98 and 100 are disabled and one input to AND gate 104 is a logic high and will assert BK_MATCH <N> if the address bits and interleave bits match as discussed above (i.e., one memory bank is mapped to one memory bank mapping register).

Conversely, if SINGLE_BK is deasserted indicating that the memory bank mapping register will be used to decode two memory banks, neither AND gate 98 nor AND gate 100 are automatically disabled. FIG. 7 shows a four bit multiplexor 106 (i.e., MUX) for which Intmask <3:2> are the select bits. With SINGLE_BK at logic low, NOT gate 96 provides a logic high to one input of AND gate 98. The output of MUX 106 is connected to the second input of AND gate 98, and thus, the output of AND gate 98 depends upon the output of MUX 106.

MX 106 determines what multiple-way interleaving will be used. As mentioned above, when one memory bank mapping register is used to match more than one memory bank, some amount of interleaving is required. Where one memory bank mapping register is used to match two memory banks, there is at least two-way interleaving. However, a higher level of interleaving is possible through MUX 106.

If only two-way interleaving is to be implemented, Intmask <3:2> is set to logic low. The decoder 90, according to the above table, provides logic high on each bit of INT_MASK <2:0> 92. This will force all OR gates 86 to provide a logic high output on INT_SEL <3:0> regardless of whether Intlv <6:4> matched CPU_ADDRESS <8:6>. However, when MUX 106 receives logic lows on the select lines, its first input, CPU_ADDRESS <6>, is passed to the output. If CPU_ADDRESS <6> is a logic high, then AND gate 98 provides a logic high to AND gate 100 and NOT gate 102 which causes BK_MATCH <N+8> to be asserted if VALID and ADR_SEL <13:0> are logic highs. If CPU_ADDRESS <6> is a logic low, then AND gate 98 provides a logic low to AND gate 100 and NOT gate 102 which causes BK_MATCH <N> to be asserted if VALID and ADR_SEL <13:0> are logic highs. Thus, two-way interleaving is achieved where BK_MATCH <N> is used to select one of the lower eight numbered memory banks and BK_MATCH <N+8> is used to select one of the upper eight numbered memory banks as will be discussed below.

As shown in FIG. 7, MUX 106 accepts four inputs, CPU_ADDRESS <9:6>. This allows for sixteen-way interleaving of the same sixteen memory banks. For example, if Intmask <3:2> is set to logic highs, decoder 90, according to the above table, will provide logic lows on INT_MASK <2:0>92. INT_MASK <2:0> being logic lows results in the outputs of OR gates 86, INT_SEL <3:0>, being dependent upon the results of XNOR gates 84 which above resulted in eight-way interleaving. However, Intmask <3:2> are also the select lines for MUX 106, and when Intmask <3:2> are logic highs, the fourth input, CPU_ADDRESS <9>, is passed through to the output of NUX 106. This provides for sixteen-way interleaving.

Each memory bank mapping register can be used differently. For example, one or more memory bank mapping registers may have the SINGLE_BK bit asserted, and thus, only be used to match one memory bank each, and one or more memory bank mapping registers may have the SINGLE_BK bit deasserted, and thus, only be used to match two memory banks each. In any case, this is a design decision dependent upon the number of memory banks, the number of memory bank mapping registers, and the amount of interleaving desired.

Additionally, the memory bank mapping registers may be designed with a multiple-bank matching field having more than one bit allowing the memory mapping registers to be used to match multiple memory banks. For example, two bits would allow one memory bank mapping register to match four memory banks. Of course additional matching logic would be needed to provide the two additional BK_MATCH <N+4> and BK_MATCH <N+12> signals.

In the above described case, each of the memory bank mapping registers and associated matching logic provide two bank matching signals, BK_MATCH <N> and BK_MATCH <N+8>. All eight memory bank mapping registers send these two signals to the sixteen to four bit encoder 80 of FIG. 5 which drives CPU_BK_ID <3:0> to the CPU bus interface logic 30. Thus, only eight memory bank mapping registers are needed to decode which of sixteen memory banks the processor (not shown) is trying to access.

As the previous discussion indicates, the configuration of the present computer system's main memory is flexible. In a preferred embodiment, the memory bank mapping registers permit the configuration software to interleave all, some, or none of the memory banks and additionally, allow all, some, or none of the memory bank mapping registers to be used to match multiple memory banks. Further, the flexibility in assigning address ranges to memory banks permits memory modules having different numbers of memory banks and memory banks of different sizes to be used in the same system.

Figure 8:
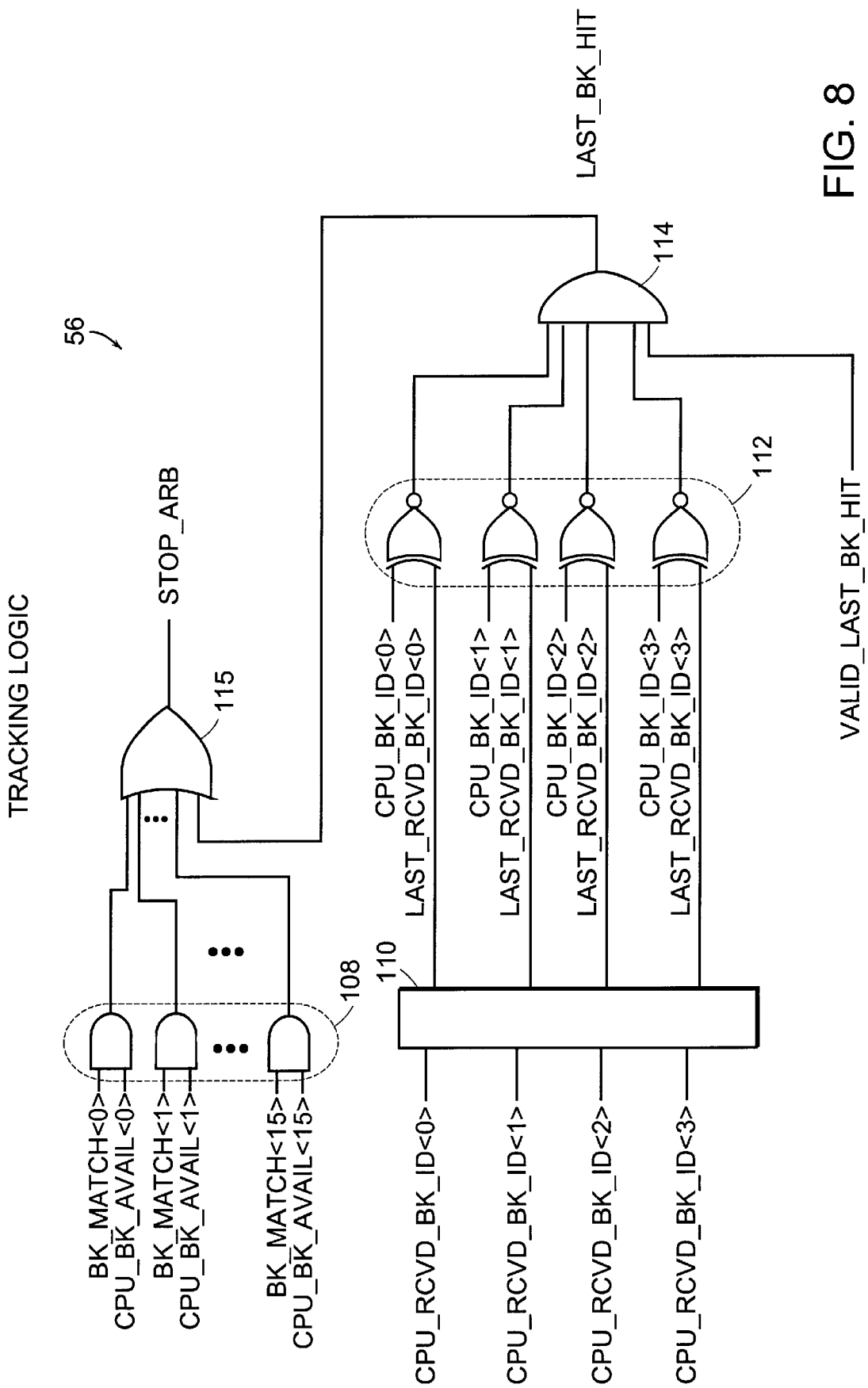
FIG. 8 is a more detailed block diagram of the tracking logic of FIG. 3 in accordance with the invention.

Referring now to FIG. 8, a detailed diagram of one embodiment of tracking logic 56 (FIG. 3) is shown. Tracking logic 56 includes a series of sixteen, two-input AND gates 108 which are used to determine if the bank to be accessed is deasserting its bank available signal. Each of the bank match signals, BK_MATCH <15:0>, from decode logic 54 (FIG. 3) are compared to each of the received bank available signals, CPU_BK_AVAIL <15:0>, to determine if the bank to be accessed is available. This allows banks which are accessed by transactions prior to the current transaction to indicate that they are unavailable, and allows memory banks involved with write transactions to prevent subsequent accesses until the write is complete.

As discussed previously, where the memory banks are able to indicate their availability status on CPU_BK_AVAIL <15:0> during the next address cycle following the cycle in which they are addressed, such that the compare of BK_MATCH <15:0> to CPU_BK_AVAIL <15:0> is sufficient to determine if the processor is trying to access an available memory bank, no additional tracking logic is necessary. However, if the memory bank's indication of availability status is not indicated until the end of the next address cycle or until a subsequent address cycle, then additional tracking logic needs to be employed to determine the previously accessed memory banks such that an inference that a previously accessed memory bank is unavailable is established until the memory bank deasserts its memory bank available signal.

Additional tracking logic may also be required where the memory modules have transaction queues and are capable of accepting multiple transactions. Such a memory module will not be unavailable until its transaction queue is filled. Where a memory bank's indication of availability status is not indicated until the end of the next address cycle or until a subsequent address cycle after the transaction queue is filled, the tracking logic is necessarily more complex. In such a situation, the tracking logic needs to keep track of the number of transactions each memory module is capable of accepting and the number of outstanding transactions currently in each memory module's queue.

Where memory banks are able to indicate their availability at the end of the next address cycle, the tracking logic may include logic which latches the previous address cycle's CPU_RCVD_BK_ID <3:0> bits in order to compare them to the current CPU_BK_ID <3:0> bits representing the memory bank the processor wishes to access. As shown in FIG. 8, a register 110 is used to latch the previous address cycles's CPU_RCVD_BK_ID <3:0> bits. Further, a series of four, two input XNOR gates 112 are used to compare the last received bank identification bits, LAST_RCVD_BK_ID <3:0> to the bank identification bits, CPU_BK_ID <3:0> generated by decode logic 54 (FIG. 3). If each bit of LAST_RCVD_BK_ID <3:0> matches each bit of CPU_BK_ID <3:0> then each of the XNOR gates will produce a logic high. If VALID_LAST_BK_HIT is also asserted, AND gate 114 will assert the last bank hit signal, LAST_BK_HIT, which indicates that the previous system bus transaction was directed at the same memory bank the processor now wants to access. Thus, the inference that the previously accessed memory bank is unavailable is established during the address cycle subsequent to the address cycle in which the memory bank was addressed. In the following address cycle, the memory bank's availability status will be indicated on its memory bank available signal such that the unavailability inference is no longer necessary.

The default value of CPU_RCVD_BK_ID <3:0> is zero or deasserted. Therefore, if the commander was trying to access the memory bank associated with a zero value on CPU_RCVD_BK_ID <3:0> after register 110 had latched in the default value of zero on each line, LAST_BK_HIT would be asserted and prevent the access. In such a situation VALID_LAST_BK_HIT would be deasserted such that LAST_BK_HIT would also remain deasserted and the access would be permitted.

The outputs of the series of AND gates 108 as well as the output of AND gate 114 are the inputs to OR gate 115. If any of the inputs to OR gate 115 are asserted, then OR gate 115 asserts the stop arbitration signal, STOP_ARB, to indicate that the memory bank to be accessed is currently unavailable and the request for arbitration should be withdrawn.

If the memory banks are not able to indicate their availability until subsequent address cycles (i.e., two or more address cycles following the cycle in which the memory bank is addressed) or if the memory banks have transaction queues, the tracking logic may include additional logic (not shown) to establish the inference that the previously accessed memory banks are unavailable.

For computer systems in which memory banks indicate that they are unavailable during memory refresh cycles, the same timing considerations are necessary. Because a memory refresh can happen at any time, no tracking logic can be used to establish an inference that the memory bank is busy with a memory refresh until the availability status is indicated on the memory bank available lines. Thus, the memory banks must be able to indicate that they are busy with a memory refresh at the beginning of an address cycle such that the compare of BK_MATCH <15:0> to CPU_BK_AVAIL <15:0> is sufficient to determine if the processor is trying to access an available memory bank.

An alternative to indicating that the memory bank is unavailable due to a memory refresh is to synchronize memory refresh cycles between all the memory banks of the computer system. If all memory refresh cycles are executed simultaneously, there is no need to indicate such a status on the memory bank available signals. In this case, because the system bus will hang during the refresh cycle, any commander gaining control over the system bus will hang. Thus, a first commander module who is hung on the system bus during the refresh cycle is not gaining control over a second commander module which could have completed its transaction. Therefore, it remains that all transactions on the system bus will be directed at available memory modules.

As mentioned above, within compare logic 62, 64 of memory module 16 is a VID register 63, 65 (FIG. 3) which is loaded by the configuration software. The VID register contains a number of bits equal to the number of MEM_

RCVD_BK_ID <3:0> 66 bits which equals the number of BK_ID <3:0> 52 bits and CPU_RCVD_BK_ID <3:0> 60 bits. Each VID register corresponds to one memory mapping register within decode logic 54 (FIG. 3), and each VID register contains bits which match memory bank identification signal values associated with the corresponding memory mapping register. The VID register bits are also used to determine which bank available signal corresponds to the associated memory bank.

Figure 9:
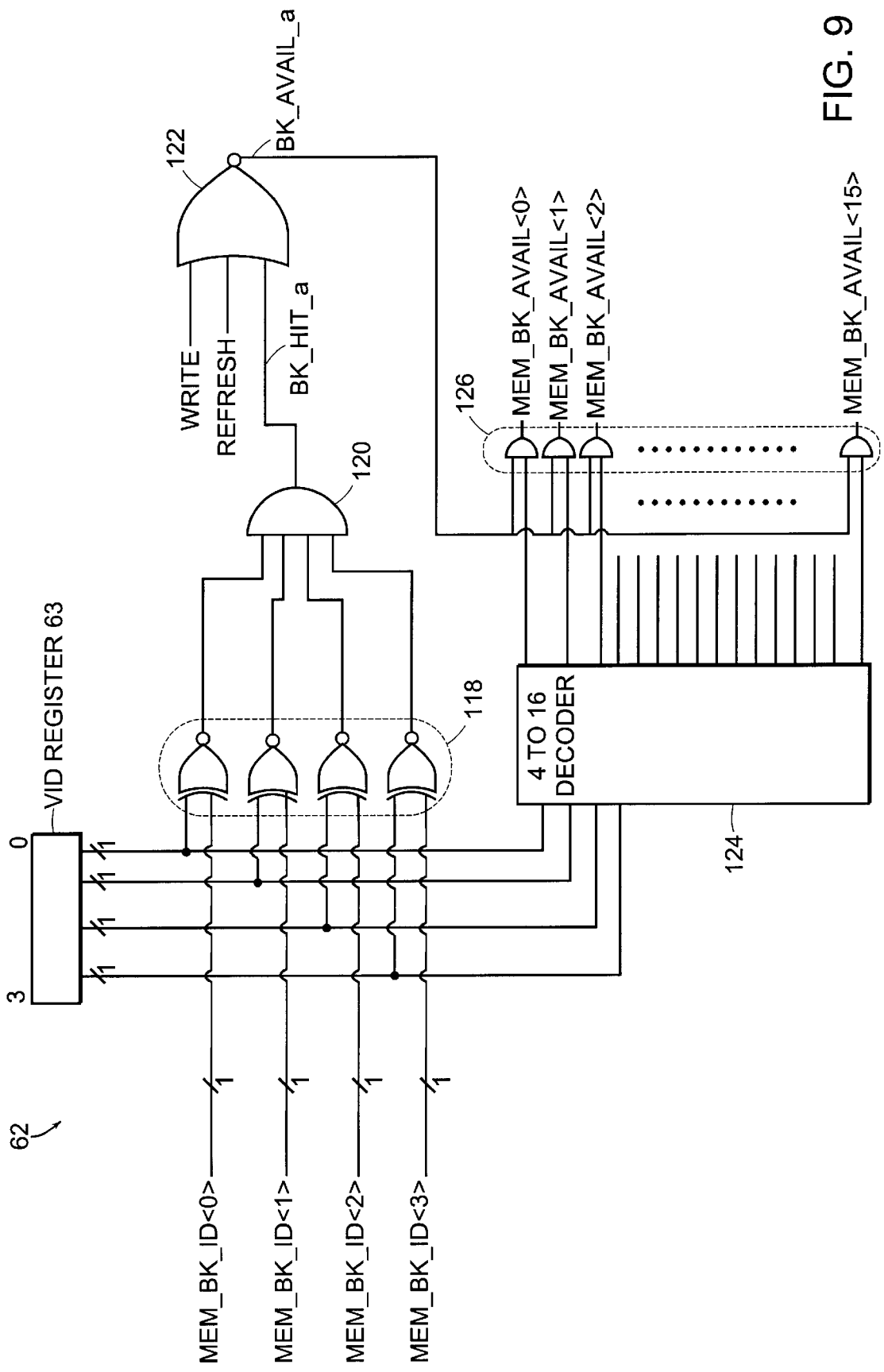
FIG. 9 is a more detailed block diagram of the compare logic of FIG. 3 in accordance with the invention.

Referring now to FIG. 9, a VID register 63 within compare logic 62 is shown to include four bits. The compare logic 62 will be described with the understanding that compare logic 64 would be similar. FIG. 9 further shows a series of four, two-input XNOR gates 118 which compare each bit of MEM_RCVD_BK_ID <3:0> 66 from memory system bus interface 32 (FIG. 3) to each bit of VID register 63. As previously mentioned, if the inputs to the XNOR gates 118 match, then the XNOR gates will provide logic highs on their outputs. As shown, the output of each XNOR gate in the series of XNOR gates 118 is connected to AND gate 120. Thus, if each of the bits of MEM_RCVD_BK_ID <3:0> match each of the bits of VID register 63, then XNOR gates 118 will drive logic highs to the inputs of AND gate 120 which will assert a bank hit signal, BK_HIT_a.

BK_HIT_a indicates that the current system bus transaction is attempting to access the memory bank 16a associated with compare logic 62 and VID register 63. Control logic (not shown) associated with memory bank 16a as well as refresh logic 50 and write hold logic 49 on memory module 16 receive BK_HIT_a. The control logic will respond to the current bus transaction, while the refresh logic 50 will cancel and reschedule any required memory refresh cycle until BK_HIT_a is deasserted indicating that the transaction is complete.

As also shown in FIG. 9, BK_HIT_a is one input to a three-input NOR gate 122. The WRITE signal from write hold logic 49 and the REFRESH signal from refresh logic 50 (FIG. 3) are also inputs to OR gate 122. If BK_HIT_a, REFRESH, or WRITE are asserted, then the output of OR gate 122, BK_AVAIL, will be deasserted. Each of these three signals indicates that the associated memory bank 16a is unavailable.

Compare logic 62 also includes a four to sixteen bit decoder 124. The four bits of VID register 63 are the inputs to decoder 124, and each of the sixteen outputs of decoder 124 are driven to one input of a two-input AND gate in a series of sixteen AND gates 126. The outputs of AND gates 126 are the memory bank available signals, MEM_BK_AVAIL <15:0>, driven to memory system bus interface 32 (FIG. 3). The one asserted output of decoder 124 indicates which memory bank available signal is associated with the corresponding memory bank. The second input of each AND gate in the series of AND gates 126 is BK_AVAIL from OR gate 122. If BK_AVAIL is asserted, then the AND gate in the series of AND gates 126 having its input from decoder 124 asserted will assert its output, MEM_BK_AVAIL <N> where N is a value of zero to fifteen.

Following a transaction, the MEM_BK_ID <3:0> signals will be deasserted and BK_HIT_a will also be deasserted. If the system bus protocol requires that the BK_HIT_a signal be deasserted prior to the end of the transaction or asserted following the transaction, then the MEM_BK_ID <3:0> signals may be latched (not shown) prior to being driven to XNOR gates 118 and the appropriate timing logic connected to the latches to deassert the outputs of the latches at the appropriate time. Such timing logic is known to one of skill in the art and will not be further described.

Further, if the transaction directed at the memory bank is a write transaction, the write hold logic 49 (FIG. 3) will assert the WRITE signal. This forces NOR gate 122 to keep BK_AVAIL deasserted which keeps the corresponding memory bank available signal deasserted until the WRITE signal or BK HIT a is deasserted. Thus, the write hold logic 49 may also include timing logic (not shown) which keeps the WRITE signal asserted following a transaction until the data received from the system bus is written into the RAMs (not shown) of the memory bank.

Additionally, the refresh logic 50 may receive the BK_AVAIL_a signal from compare logic 62 and following the assertion of BK_HIT_a assert the REFRESH signal, in order to keep the associated memory bank available signal deasserted following the transaction, (i.e., BK_HIT a is deasserted). This will prevent the assertion of the associated MEM_BK_AVAIL <N> signal following the transaction which will allow an immediate refresh cycle without the danger that a commander module may attempt to access the memory bank during the refresh cycle. As previously mentioned, an alternative is to synchronize the refresh cycles of all the memory banks and not include such a cycle in the conditions which affect the memory bank's availability status.

As mentioned above, a commander module, such as a CPU or an I/O module, may determine which memory bank it wishes to access while it is arbitrating for control of the system bus. Through the use of the memory bank available signals and the previous transaction's memory bank identification signals, commander modules may determine whether the memory bank they wish to access is available. Where the memory bank is unavailable, the commander module may withdraw its requests for control of the system bus which prevents the commander module wishing to access a memory bank which is unavailable from gaining control of the system bus. This efficient use of the system bus alleviates the need in the computer system for hardware to handle an unavailable memory bank situation and improves the computer system's performance.

Having described preferred embodiments of the invention, it will now become apparent to one of skill in the art that other embodiments incorporating their concepts may be used. Accordingly, it is submitted that the invention should not be limited to the disclosed embodiments, but rather should be limited by the spirit and scope of the appended claims.

What is claimed is:

1. A computer system comprising:
   a system bus including a plurality of memory bank available signals;
   a plurality of memory modules coupled to said system bus, each of said plurality of memory modules comprising:
      at least one memory bank for storing data in addressable locations;
      means for associating said memory bank with one of said plurality of memory bank available signals; and
      means for determining an availability status of said memory bank and for providing said associated memory bank available signal with values reflecting said availability status; and
   a plurality of commander modules coupled to said system bus, and capable of initiating transactions on said system bus, each of said plurality of commander modules comprising:
      means, responsive to said memory bank available signals, for preventing said each commander module from gaining control of said system bus for transaction requests that involve an unavailable one of said memory banks.

2. The computer system according to claim 1, wherein said each commander module further comprises:
   means for generating an address of a transaction to be driven on said system bus; and wherein said preventing means comprises:
      means for decoding said address to determine a target memory bank of said transaction;
      means for comparing said target memory bank to said plurality of memory bank available signals to determine whether said target memory bank is available; and
   means, responsive to said comparing means, for interrupting an attempt by said each commander module to gain control of said system bus when said target memory bank is unavailable.

3. The computer system according to claim 2, wherein said interrupting means inhibits said each commander module from beginning arbitration for control of said system bus.

4. The computer system according to claim 2, wherein said interrupting means stops said each commander module from continuing to arbitrate for control of said system bus.

5. The computer system according to claim 2 wherein said comparing means compares said address of said transaction to another address of a prior transaction which had gained control of said system bus.

6. The computer system according to claim 5 wherein each of said plurality of memory banks further includes means, responsive to a predetermined address range driven on said system bus, for responding to transactions initiated by said plurality of commander modules on said system bus.

7. The computer system according to claim 6 wherein
   each memory module includes a plurality of memory banks,
   each of said plurality of memory modules further includes means, responsive to a write transaction to a respective memory bank of a memory module, for indicating said write transaction while said write transaction is executing on said system bus and following completion of said write transaction on said system bus until data transferred in said write transaction is written into said respective memory bank of said memory module, and
   said means for indicating said write transaction uses the memory bank available signal associated with said respective memory bank.

8. The computer system according to claim 7, wherein said determining means is responsive to said comparing means and said means for indicating a write transaction.

9. The computer system according to claim 7, wherein each of said plurality of memory modules further includes means for executing a memory refresh cycle indicating a memory refresh cycle prior to and during execution of a memory refresh cycle using one of said memory bank available signals associated with said memory banks of said each memory module.

10. The computer system according to claim 9, wherein said determining means is responsive to said comparing means, said means for indicating a write transaction, and said means for executing a memory refresh cycle.

11. The computer system according to claim 7 wherein each of said plurality of memory modules further includes means for executing a memory refresh cycle, wherein said means for executing a memory refresh cycle of each of said plurality of memory modules are synchronized to execute periodically during the same system bus cycle.

12. The computer system according to claim 1, wherein each of said plurality of memory modules comprises:
   a plurality of memory banks for storing data in addressable locations;
   means for associating each of said plurality of memory banks with one of said plurality of memory bank available signals; and
   means for determining an availability status of each of said plurality of memory banks and for providing said associated memory bank available signals with values reflecting said availability status of each of said plurality of memory banks.

13. The computer system according to claim 1, wherein said system bus further includes memory bank identification signals;
   wherein each of said memory banks further includes means, responsive to a predetermined value driven on said memory bank identification signals, for responding to transactions initiated by said plurality of commander modules on said system bus;
   wherein said commander module further comprises:
      means for generating an address of a transaction to be driven on said system bus, and wherein said preventing means comprises:
         means for decoding said address to determine a target memory bank of said transaction and for providing on said memory bank identification signals values corresponding to said target memory bank;
         means for comparing said memory bank available signals to said memory bank identification signals to determine whether said target memory bank is unavailable; and
         means, responsive to said comparing means, for interrupting an attempt by said commander module to gain control of said system bus when said target memory bank is unavailable.

14. The computer system according to claim 13, wherein said comparing means further compares said address of said transaction to another address of a prior transaction which gained control of said system bus.

15. The computer system according to claim 14, wherein said responding means comprises compare logic including a virtual node identification register for storing said predetermined value.

16. The computer system according to claim 15, wherein said associating means includes means for decoding said predetermined value in said virtual identification register.

17. The computer system according to claim 16, wherein each of said plurality of memory modules further includes means, responsive to a write transaction to one of said memory banks of said each memory module, for indicating said write transaction while said write transaction is executing on said system bus and following a completion of said write transaction to said system bus until data transferred in said write transaction is written into said one memory bank of said each memory module, and wherein said means for indicating a write transaction uses one of said plurality of memory bank available signals associated with said one memory bank.

18. The computer system according to claim 17, wherein said determining means is responsive to said comparing means and said means for indicating a write transaction.

19. The computer system according to claim 17, wherein each of said plurality of memory modules further includes means for executing a memory refresh cycle indicating a memory refresh cycle prior to and during the execution of a memory refresh cycle using one of said memory bank available signals associated with said memory banks of said each memory module.

20. The computer system according to claim 19, wherein said determining means is responsive to said comparing means, said means for indicating a write transaction, and said means for executing a memory refresh cycle.

21. The computer system according to claim 17, wherein each of said plurality of memory modules further includes means for executing a memory refresh cycle, wherein said means for executing a memory refresh cycle of each of said plurality of memory modules are synchronized to execute periodically during the same system bus cycle.

22. The computer system of claim 13, wherein said preventing means further comprises:
   means for comparing said target memory bank to a memory bank corresponding to a prior transaction request which had gained control of said system bus.

23. The computer system of claim 1 further comprising:
   means for granting control of said system bus to one of said plurality of commander modules wherein said means for determining an availability status of a memory bank and said means for granting control of said system bus are initiated substantially simultaneously.

24. The computer system of claim 23, wherein said means for granting control uses central arbitration.

25. The computer system of claim 23, wherein said means for granting control uses distributed arbitration.

26. The computer system of claim 25, wherein said means for preventing said each commander module from gaining control of said system bus includes:
   tracking logic which determines the availability of said memory banks using said memory bank available signals and asserts a stop arbitration signal if a requested memory bank is determined to be unavailable; and
   arbitration logic which generates an arbitration request for control of said system bus in response to one or more of said plurality of commander modules requesting use of said system bus to access an available one of said memory banks of one of said plurality of memory modules, and wherein, in response to said stop arbitration signal, said arbitration logic withdraws said arbitration request if said arbitration logic has not yet been granted control of said system bus.

27. A computer system comprising:
   a system bus including a plurality of memory bank available signals;
   a plurality of memory modules coupled to said system bus, each of said plurality of memory modules comprising
      at least one memory bank for storing data in addressable locations and being associated with one of said plurality of memory bank available signals, each of said plurality of memory modules comprising:
      means for determining an availability status of said memory bank and for providing said associated memory bank available signal with values reflecting said availability status; and
   a plurality of commander modules coupled to said system bus and capable of initiating transactions on said system bus, each of said plurality of commander modules comprising:
      means for determining the availability of a memory bank requested in a current transaction, said means for determining the availability of a memory bank comprising:
         means for determining a target memory bank requested in said current transaction; means for comparing said memory bank available signals to said target memory bank; and
         means for comparing characteristics of a prior transaction which has gained control of said system bus to characteristics of said current transaction; and
      means, responsive to said means for determining the availability of a memory bank, for preventing said each commander module from gaining control of said system bus for transaction requests involving an unavailable one of said memory banks.

28. The computer system of claim 27, wherein said means for comparing characteristics of a prior transaction to characteristics of a current transaction includes:
   means for comparing a first address of said current transaction to be driven on said system bus to a second address of a prior transaction previously transferred on said system bus, and wherein said preventing means is also responsive to said means for comparing a first address to a second address.

29. The computer system of claim 27, wherein said means for comparing characteristics of a prior transaction to characteristics of a current transaction includes:
   means for comparing a first memory bank identifier associated with one of said plurality of memory banks to a second memory bank identifier associated with a second of said plurality of memory banks.

30. The computer system of claim 29, wherein said means for preventing said each commander module from gaining control of said system bus includes:
   tracking logic which determines the availability of said memory banks using said memory bank available signals and asserts a stop arbitration signal if a requested memory bank is determined to be unavailable; and
   arbitration logic which generates an arbitration request for control of said system bus in response to one or more of said plurality of commander modules requesting use of said system bus to access an available one of said memory banks of one of said plurality of memory modules, and wherein, in response to said stop arbitration signal, said arbitration logic withdraws said arbitration request if said arbitration logic has not yet been granted control of said system bus.

31. The computer system of claim 30, wherein each of said plurality of memory modules further includes:
   means, responsive to a write transaction to one of said memory banks of said each memory module, for indicating said write transaction while said write transaction is executing on said system bus and following a completion of said write transaction on said system bus until data transferred in said write transaction is written into said one memory bank, and wherein said means for indicating said write transaction uses one of said plurality of memory bank available signals associated with said one memory bank.

32. The computer system of claim 31, wherein each of said plurality of memory modules further includes:
   means for executing a memory refresh cycle indicating a memory refresh cycle prior to and during the execution of a memory refresh cycle using one of said memory bank available signals associated with said memory bank of said each memory module.

33. The computer system of claim 29, wherein, in response to said determining means determining that said memory bank is unavailable, said arbitrating means stops arbitrating for control of said system bus if said arbitrating means has not yet been granted control of said system bus.

34. The computer system of claim 33, wherein, in response to said determining means determining that said memory bank is unavailable, a null command indicating that the system bus performs no operation is issued on said system bus.

35. The computer system of claim 34, wherein said means for determining the availability of a memory bank includes:
   means for determining a target memory bank requested in said current transaction; and
   means for comparing said memory bank available signals to said target memory bank; and
   means, responsive to said means for determining the availability of a memory bank, for preventing said each commander module from gaining control of said system bus, said current transaction involving a request for an unavailable one of said memory banks.

36. The computer system of claim 35, wherein each of said plurality of memory modules further includes:
   means, responsive to a write transaction to one of said memory banks of said each memory module, for indicating said write transaction while said write transaction is executing on said system bus and following a completion of said write transaction on said system bus until data transferred in said write transaction is written into said one memory bank, and wherein said means for indicating said write transaction uses one of said plurality of memory bank available signals associated with said one memory bank.

37. The computer system of claim 36, wherein each of said plurality of memory modules further includes:
   means for executing a memory refresh cycle indicating a memory refresh cycle prior to and during the execution of a memory refresh cycle using one of said memory bank available signals associated with said memory bank of said each memory module.

38. A computer system comprising:
   a system bus including a plurality of memory bank available signals;
   a plurality of memory modules coupled to said system bus, each of said plurality of memory modules comprising at least one memory bank for storing data in addressable locations and being associated with one of said plurality of memory bank available signals, each of said plurality of memory modules comprising:
      means for determining an availability status of said memory bank and for providing said associated memory bank available signal with values reflecting said availability status; and
   a plurality of commander modules coupled to said system bus and capable of initiating transactions on said system bus, each of said plurality of commander modules comprising:
      means, in response to said memory bank available signals, for determining the availability of a memory bank requested in a current transaction; and
      means for arbitrating for control of said system bus wherein said means for determining the availability of a memory bank executes while said means for arbitrating for control arbitrates for control of said system bus.

* * * * *